United States Patent
Kaitoh et al.

(10) Patent No.: US 12,032,256 B2
(45) Date of Patent: Jul. 9, 2024

(54) DISPLAY DEVICE

(71) Applicant: Japan Display Inc., Tokyo (JP)

(72) Inventors: Takuo Kaitoh, Tokyo (JP); Akihiro Hanada, Tokyo (JP); Yoshinori Tanaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/448,437

(22) Filed: Aug. 11, 2023

(65) Prior Publication Data
US 2024/0085750 A1   Mar. 14, 2024

(30) Foreign Application Priority Data
Aug. 25, 2022  (JP) .................. 2022-134430

(51) Int. Cl.
*G02F 1/1362*   (2006.01)
(52) U.S. Cl.
CPC .............. *G02F 1/136286* (2013.01)
(58) Field of Classification Search
CPC .................................... G02F 1/1362
See application file for complete search history.

(56) References Cited

U.S. PATENT DOCUMENTS

| | | | |
|---|---|---|---|
| 2017/0099452 A1* | 4/2017 | Kita ..................... | H05K 5/0247 |
| 2020/0119311 A1* | 4/2020 | Lim ..................... | H10K 59/879 |
| 2020/0212346 A1* | 7/2020 | Lee ..................... | H10K 59/122 |
| 2021/0286226 A1* | 9/2021 | Sugiyama ......... | G02F 1/133616 |
| 2022/0037416 A1* | 2/2022 | Irobe ................... | H10K 50/858 |

FOREIGN PATENT DOCUMENTS

JP   2020-091400 A   6/2020

\* cited by examiner

*Primary Examiner* — Sang V Nguyen
(74) *Attorney, Agent, or Firm* — Maier & Maier, PLLC

(57) ABSTRACT

A display device includes a first substrate, a gate wiring on the first substrate, a first insulating layer on the gate wiring, a source wiring on the first insulating layer and intersecting the gate wiring, a second insulating layer on the source wiring, a pixel electrode on the second insulating layer; and a first buffer layer between the first substrate and the first insulating layer. A refractive index of the first buffer layer is higher than a refractive index of the first substrate, at an interface between the first buffer layer and the first substrate, and the refractive index of the first buffer layer is lower than a refractive index of the first insulating layer, at an interface between the first buffer layer and the first insulating layer.

14 Claims, 15 Drawing Sheets

Example 1
(1 Buffer Layer)

Example 2
(2 Buffer Layer)

Example 1
(1 Buffer Layer)

DISPLAY DEVICE

CROSS-REFERENCE TO RELATED APPLICATIONS

This application claims the benefit of priority to Japanese Patent Application No. 2022-134430, filed on Aug. 25, 2022, the entire contents of which are incorporated herein by reference.

FIELD

An embodiment of the present invention relates to a display device and a method for manufacturing a display device.

BACKGROUND

In recent years, a transparent display has been developed that allows the background of the other side of the display to be viewed from one side of the display. Since transparent displays allow images to be viewed from both the front and back sides, images or text can be viewed from two opposing directions with the transparent display in between.

Japanese Unexamined Patent Application Publication No. 2020-91400 discloses a display device with an array substrate and a counter substrate, a liquid crystal layer between them, and a light source arranged so that light enters from the side of the array substrate or counter substrate.

SUMMARY

A display device in an embodiment according to the present invention includes a first substrate, a gate wiring on the first substrate, a first insulating layer on the gate wiring, a source wiring on the first insulating layer and intersecting the gate wiring, a second insulating layer on the source wiring, a pixel electrode on the second insulating layer; and a first buffer layer between the first substrate and the first insulating layer. A refractive index of the first buffer layer is higher than a refractive index of the first substrate, at an interface between the first buffer layer and the first substrate, and the refractive index of the first buffer layer is lower than a refractive index of the first insulating layer, at an interface between the first buffer layer and the first insulating layer.

DESCRIPTION OF EMBODIMENTS

Hereinafter, each embodiment of the present invention will be described with reference to the drawings and other materials. However, the present invention can be implemented in various aspects to the extent that it does not depart from the gist thereof, and is not to be interpreted as limited to the description of the forms illustrated below. With regard to the figures, in order to make the explanation clearer, the width, thickness, shape, and the like of each part may be represented schematically compared to the actual state, but these schematic figures are examples and are not intended to limit the interpretation of the present invention. Furthermore, in this specification and in each figure, elements that are identical or similar to those described for the previously mentioned figures may be given the same symbol and redundant explanations may be omitted. In this specification, ordinal numbers are assigned for convenience in order to distinguish parts, sections, and the like, and do not indicate priority or order.

In an embodiment of the present invention, when one film is processed to form a plurality of films, this plurality of films may have different functions and roles. However, the plurality of films is derived from films formed as the same layer by the same process, and have the same layer structure and the same material. Therefore, these pluralities of films are defined as existing in the same layer.

In this specification, expressions such as "up" and "down" express the relative positional relationship between the structure of interest and other structures. In this specification, "up" is defined as the direction from the array substrate to the counter substrate, as described below, in the side view, and "down" is defined as the opposite direction. In this specification and the scope of claims, when describing the manner in which another structure is placed on top of one structure, the term "above" is used simply to describe the placement of the structure, unless otherwise stated, it will include both cases where another structure is placed directly above a structure so as to be in contact with it, and cases where another structure is placed above a structure via another structure.

In this specification, bottom gate drive means that on/off is controlled by the gate electrode layer arranged below the semiconductor layer. In this specification, top gate drive refers to on/off controlled by a gate electrode layer arranged above the semiconductor layer. In this specification, dual gate drive means that on/off is controlled by inputting the same control signal to the gate electrode layers arranged above and below the semiconductor layer.

A display device 10 according to an embodiment of the present invention will be described with reference to FIG. 1 to FIG. 14.

Figure 1:
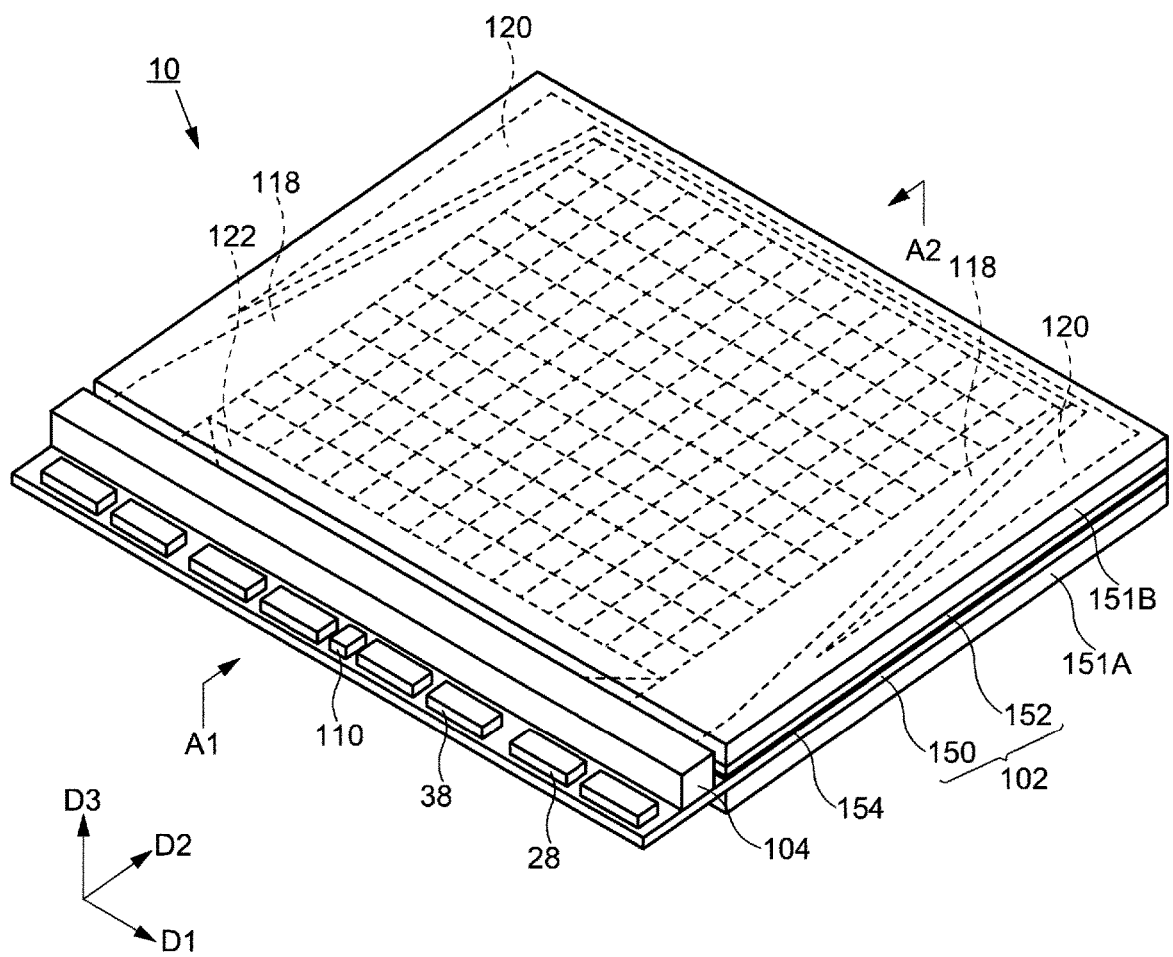
FIG. 1 is a perspective view illustrating the outline of a display device according to an embodiment of the present invention.
Figure 3:
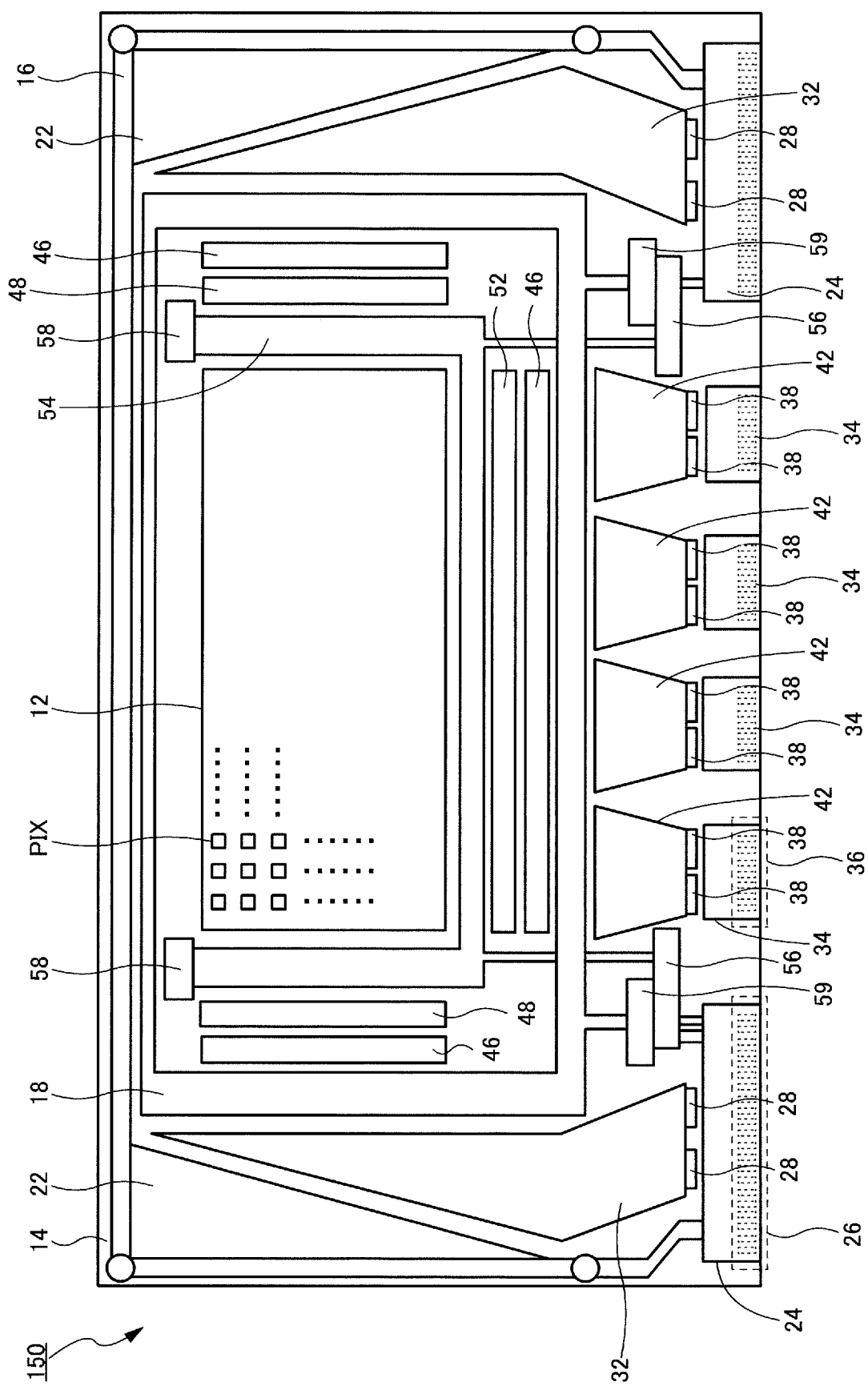
FIG. 3 is a plan view illustrating the configuration of a display device according to one embodiment of the present invention.

Outline of Display Device:

FIG. 1 shows a diagram of the display device 10 according to an embodiment of the present invention. FIG. 3 is a plan view illustrating a configuration of an array substrate 150 of the display device 10 according to an embodiment of the present invention. The display device 10 includes a display panel 102 including the array substrate 150, a counter substrate 152, and a liquid crystal layer between the array substrate 150 and the counter substrate 152 (not shown), a gate driver circuit 28, a source driver circuit 38, a light source 104, a first transparent substrate 151A and a second transparent substrate 151B, and the display panel 102. For the following description referring to FIG. 1, one direction of the plane in the display panel 102 is a direction D1, the direction orthogonal to the direction D1 is a direction D2, and the direction orthogonal to the plane D1-D2 is a direction D3.

The array substrate 150 and the counter substrate 152 have translucent properties. The array substrate 150 and the counter substrate 152 are preferably transparent to visible light. The counter substrate 152 is arranged in the direction D3 opposite the array substrate 150. The array substrate 150 and the counter substrate 152 may be arranged opposite each other with a gap between them and attached together by a sealant 154.

The display panel 102 has a display region 12 and a peripheral region 14 outside the display region 12. The display region 12 is arranged with a plurality of pixels PIX in a row direction and a column direction. Here, the row direction refers to the direction parallel to the direction D1, and the column direction refers to the direction parallel to the direction D2. The display region 12 is arranged with m pixels in the row direction and n pixels in the column direction. The values of m and n are set appropriately according to the vertical and horizontal display resolutions. The display region 12 is arranged with gate wirings (also called scanning signal lines) in the direction D1 and source wirings (also called data signal lines) in the direction D2.

Gate driver circuits 28 and source driver circuits 38 are arranged in the peripheral region 14 of the array substrate 150. FIG. 1 shows the gate driver circuit 28 and source driver circuit 38 arranged in an integrated circuit (IC) and mounted on the array substrate 150 in a COG (Chip on Glass) method. The gate driver circuit 28 and source driver circuit 38 are not limited to the illustrated configuration and may be implemented in a COF (Chip on Film) method or formed by thin-film transistors (TFT) on the array substrate 150.

A first wiring pattern 118, a second wiring pattern 120, and a third wiring pattern 122 are arranged in the peripheral region 14. The first wiring pattern 118 is a pattern formed by wirings that connect the gate driver circuit 28 and the gate wiring GL that is arranged in the display region 12. The second wiring pattern 120 is a pattern formed by common wirings. The second wiring pattern 120 is used as wiring to apply a common voltage to the common electrode 218 (refer to FIG. 7) arranged on the counter substrate 152. The third wiring pattern 122 is a pattern formed by wirings connecting the source driver circuit 38 and the data signal lines arranged in the display region 12.

The light source 104 has a structure along the direction D1. The light source 104 is configured, for example, with light emitting diodes (LEDs) arrayed along the direction D1. The detailed structure of the light source 104 is not limited and may include optical components such as reflectors, diffusers, and lenses in addition to the light emitting diodes arrayed in the direction D1. The light source 104 and a light emission control circuit 110 that controls the light source 104 may be arranged as a separate component separated from the display panel 102, the light source 104 may have its light emission timing controlled by the light emission control circuit 110 that is synchronized with the gate driver circuit 28 and the source driver circuit 38. The light emission control circuit 110 that controls the light source 104 may be arranged as a separate component separate from the display panel 102, may be mounted on the array substrate 150 as a separate component, or may be incorporated into the gate driver circuit 28 or source driver circuit 38.

The display region 12 and peripheral region 14 are sandwiched between the first transparent substrate 151A and the second transparent substrate 151B. The first transparent substrate 151A and the second transparent substrate 151B have a function as protective members for the display panel 102. As will be explained with reference to FIG. 2, the first transparent substrate 151A and the second transparent substrate 151B have a function as light guide plates that guide light emitted from the light source 104 to the display panel 102.

Figure 2:
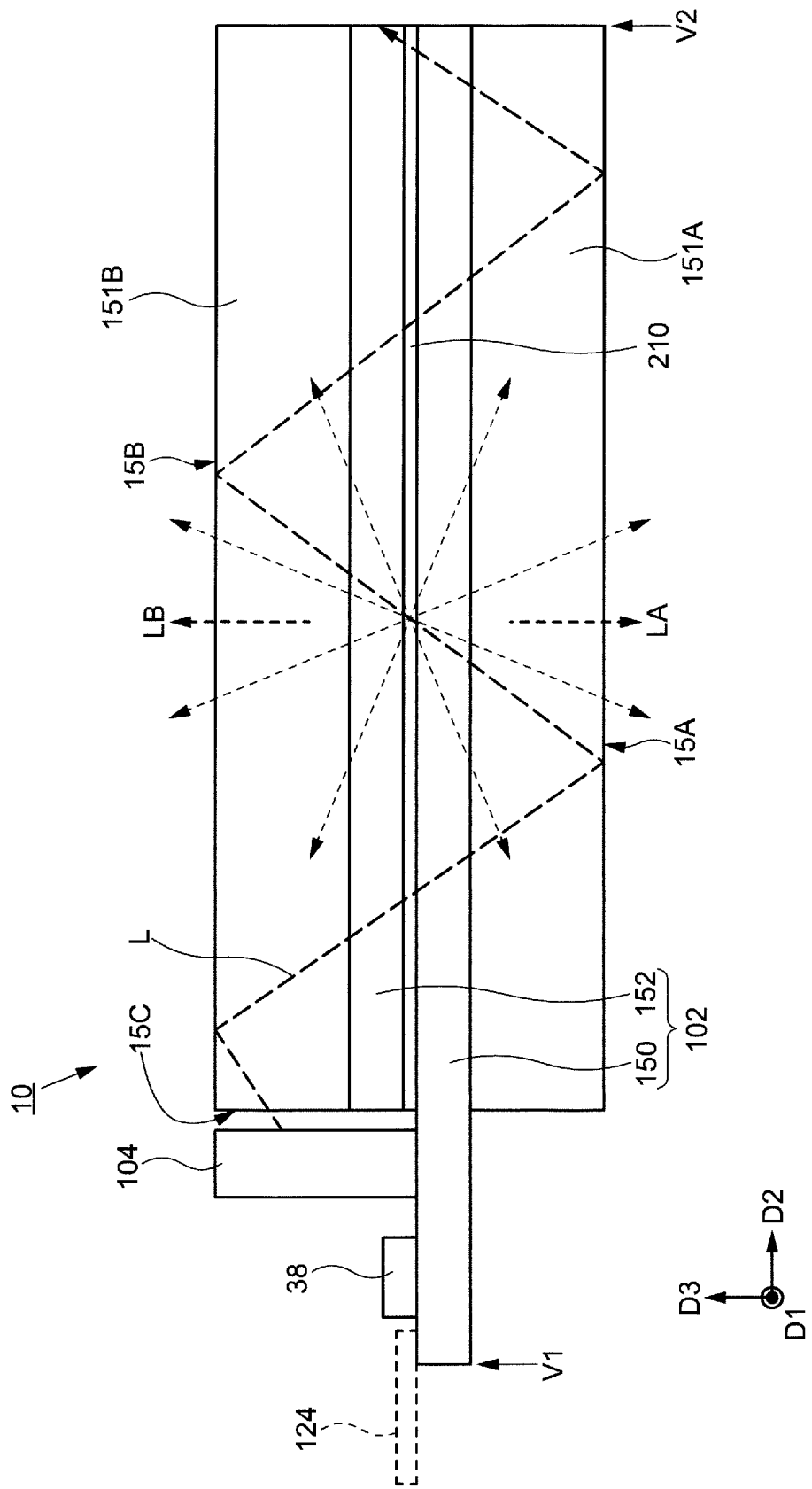
FIG. 2 is a schematic cross sectional view showing the corresponding structure between A1-A2 of the display device shown in FIG. 1.

FIG. 2 shows the cross-sectional structure of the display device 10 corresponding to the section between A1-A2 shown in FIG. 1. As shown in FIG. 2, the first transparent substrate 151A is arranged on the array substrate 150 side of the display panel 102, and the second transparent substrate 151B is arranged on the counter substrate 152 side. The first transparent substrate 151A and the second transparent substrate 151B are glass or plastic substrates. The first transparent substrate 151A and the second transparent substrate 151B preferentially have the same refractive index as the array substrate 150 and the counter substrate 152. The array substrate 150 and the first transparent substrate 151A and the counter substrate 152 and the second transparent substrate 151B may be bonded with a transparent adhesive that is not shown.

The display panel 102 is arranged so that the array substrate 150 and the counter substrate 152 are arranged facing each other, and the liquid crystal layer 210 is arranged between the array substrate 150 and the counter substrate 152. The array substrate 150 is larger than the counter substrate 152 and is sized such that a portion of the peripheral region 14 is exposed from the counter substrate 152. The driver circuit (for example, the source driver circuit 38 in FIG. 2) is mounted on the array substrate 150. A flexible wiring substrate 124 is mounted on the periphery of the array substrate 150.

The light source 104 is arranged adjacent to one side of the first transparent substrate 151A or the second transparent substrate 151B. FIG. 2 shows a configuration in which the light source 104 is arranged along one side of the second transparent substrate 151B. FIG. 2 also shows a configuration in which the light source 104 is mounted on the array substrate 150, but there is no limitation on the placement of the light source 104 and no limitation on the mounting structure as long as the mounting position can be fixed. The light source 104 may be supported, for example, by a housing surrounding the display panel 102.

As shown in FIG. 2, the light source 104 is arranged along a first side 15C of the second transparent substrate 151B. As shown in FIG. 2, the light source 104 emits light L to the first side 15C of the second transparent substrate 151B. The light source 104 is referred to as a side light source because it emits light L toward the first side 15C. The first side 15C of the second transparent substrate 151B facing the light source 104 is the light-entering surface.

As shown schematically in FIG. 2, the light L incident from the first side 15C of the second transparent substrate 151B propagates in the direction away from the first side 15C (direction D2) while being reflected by a second plane 15B of the second transparent substrate 151B and a first plane 15A of the first transparent substrate 151A. When the light L passes outward from the first plane 15A of the first transparent substrate 151A and the second plane 15B of the second transparent substrate 151B, it will proceed from a medium with a large refractive index to a medium with a small refractive index. When the angle of incidence of the light L incident on the first plane 15A and the second plane 15B is larger than the critical angle, the light will be totally reflected and will be guided in the direction D2 while being reflected by the first plane 15A and the second plane 15B.

The liquid crystal layer 210 is formed by polymer-dispersion type liquid crystal. The liquid crystal layer 210, which is formed of a polymer-dispersion type liquid crystal, is controlled to be in a scattering state and a non-scattering state for each pixel PIX. As shown in FIG. 2, the light L that propagates while being reflected by the first plane 15A and the second plane 15B is scattered at least partially when there is a pixel where the liquid crystal layer 210 is in a scattering state, when the incident angle of the scattered light is smaller than the critical angle, the scattered light LA and LB are emitted outward from the first plane 15A and the second plane 15B, respectively, and the emitted scattered light LA and LB are observed by an observer. Except for the areas where scattered light LA and LB are emitted, the array substrate 150 and the counter substrate 152, as well as the first transparent substrate 151A and the second transparent substrate 151B, are translucent (transparent to visible light), and the liquid crystal layer 210 is substantially transparent because it is in a non-scattering state, the background of the array substrate 152 is visible from the array substrate 150, and the background of the array substrate 150 is visible from the counter substrate 152, allowing an observer to view the rear side through the display panel 102.

Referring again to FIG. 3, the array substrate 150 includes the display region 12 and peripheral region 14, as described above.

The display region 12 has a plurality of pixels PIX arranged in a matrix. Each of the plurality of pixels PIX has a plurality of transistors and liquid crystal elements.

The peripheral region 14 is arranged to surround the display region 12. The peripheral region 14 refers to the region on the array substrate 150 from the display region 12 to the edge of the array substrate 150. In other words, the peripheral region 14 refers to the region on the array substrate 150 other than the display region 12 (that is, the region outside the display region 12).

In addition to gate driver circuits 28 and source driver circuits 38, gate wiring regions 32, source wiring regions 42, common wirings 16, 18, terminal parts 26, 36, flexible printed circuits 24, 34, and various inspection circuits are arranged in the peripheral region 14. The terminal parts 26, 36, are arranged along one edge of the array substrate 150.

The flexible printed circuit 24 is connected to the terminal part 26. The flexible printed circuit 24 supplies various signals to the gate driver circuits 28, the common wirings 16, 18, the ESD protection circuits 59, and the QD pads 56. The gate driver circuits 28 are connected to the plurality of gate wirings GL, and each of the plurality of gate wirings GL is electrically connected to each of the plurality of pixels PIX in the display region 12. FIG. 3 represents the region where the plurality of gate wirings GL is arranged as the gate wiring region 32, and the detailed arrangement of the plurality of gate wirings GLs is omitted from the figure. The number of gate wirings GL connected to the two gate driver circuits 28 corresponds to the number of rows of pixels PIX in the display region 12. In FIG. 3, the gate wiring regions 32 are shown in a configuration where the gate wiring regions 32 are separated from the display region 12, but in reality, the gate wirings GL are electrically connected to the pixel PIX.

The flexible printed circuit 34 is connected to the terminal part 36. The flexible printed circuit 34 supplies video signals to the source driver circuits 38. The source driver circuits 38 are connected to the plurality of source wirings SL, and each of the plurality of source wirings SL is electrically connected to each of the plurality of pixels PIX in the display region 12. FIG. 3 represents the region where the plurality of source wirings SL is arranged as the source wiring region 42, and the detailed arrangement of the plurality of source wirings SL is omitted from the figure. The number of source wirings SL connected to the eight source driver circuits 38 corresponds to at least three times the number of rows of pixels PIX in the display region 12. In this embodiment, the number of source wirings SL is described for the case where the number of source wirings SL is four times the number of rows of pixels PIX in the display region 12. FIG. 3 shows a configuration in which the source wiring regions 42 are separated from the display region 12, but in reality, the source wirings SL are electrically connected to the pixel PIX.

The common wiring 18, the ESD protection circuits 46, the gate inspection circuits 48, and the inspection lines 54 are arranged between the gate wiring regions 32 and the display region 12. The common wiring 18, the ESD protection circuit 46, the source inspection circuit 52, and the inspection lines 54 are arranged between the source wiring regions 42 and the display region 12. The inspection lines 54 are connected to the ESD protection circuits 58 and the QD pads 56. The common wiring 18 is connected to the ESD protection circuits 59.

The common wiring 16 surrounds the peripheral region 14 on the array substrate 150 and is supplied with signals from the two flexible printed circuits 24. The common wiring 16 is electrically connected to the mesh common wiring 22.

The display device 10 is not limited to high-speed drive panels such as the transparent display shown in FIG. 1 and FIG. 2. The display device 10 can be applied to large, high-definition panels used in non-transparent displays.

Figure 4:
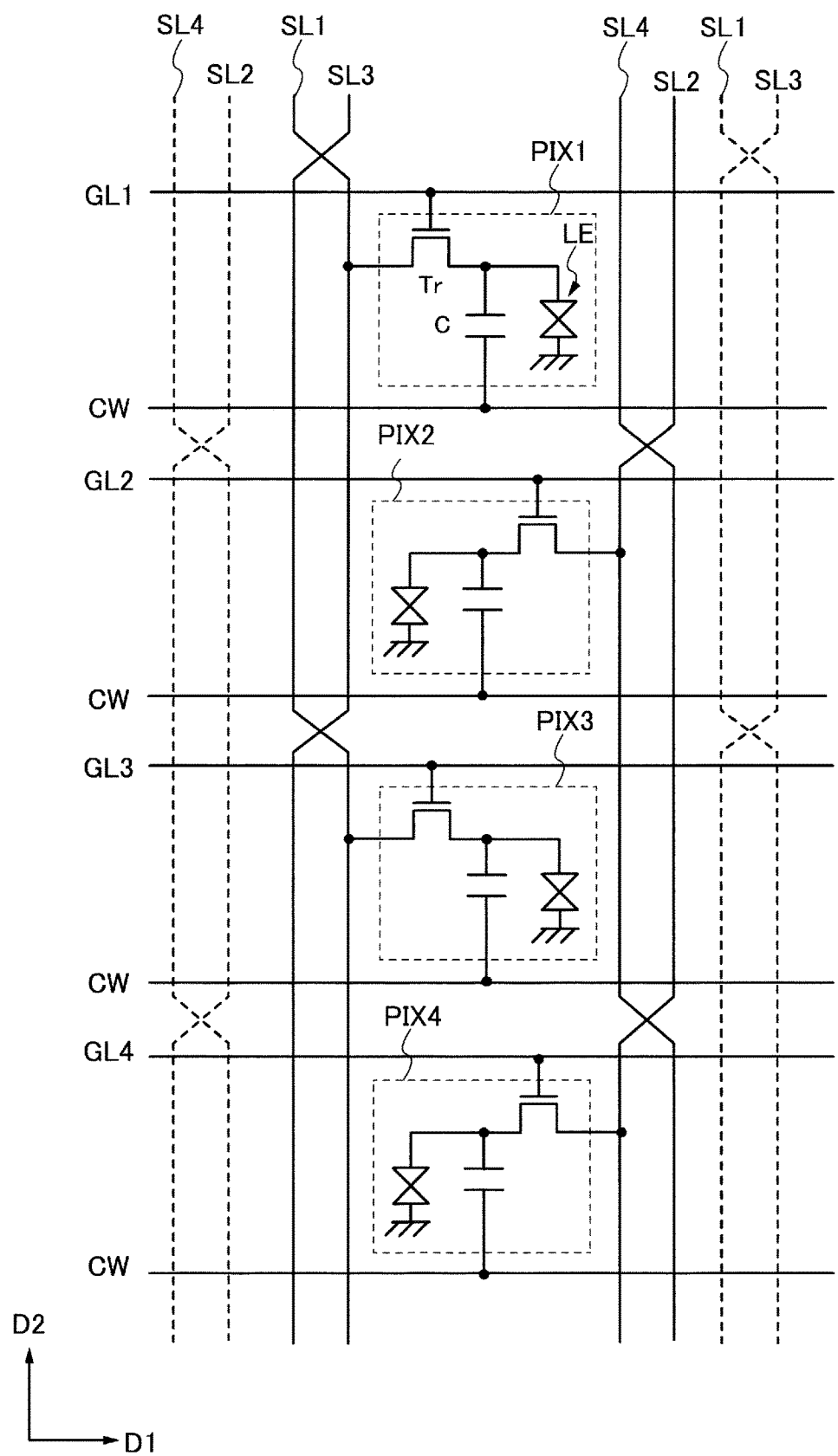
FIG. 4 is a block diagram showing a pixel in a display device according to an embodiment of the present invention.

Pixel Circuit:

FIG. 4 is a diagram illustrating the pixel circuit of the pixel PIX of the display device 10 according to an embodiment of the present invention. This embodiment describes the display device 10 in which the ON-voltage is supplied simultaneously to the four gate wirings and the four pixels lined up in the column direction can be charged simultaneously by the four source wirings. It is possible to make one horizontal period longer than the horizontal period of line sequencing by using this configuration. In other words, the time required to scan all pixel lines arranged in the display region 12 can be reduced to ¼. Therefore, it is possible to ensure sufficient charging periods for pixels in high-speed drive panels such as transparent displays and in large, high-definition panels. The configuration of the pixel in this embodiment is described in detail below.

Four pixels PIX1 to PIX4 are arranged in the column direction (direction D2) in FIG. 4. Each of the four pixels PIX1 to PIX4 is electrically connected to each of the four gate wirings GL1 to GL4. Each of the four pixels PIX1 to PIX4 is electrically connected to each of the four source wirings SL1 to SL4. Each of the four pixels PIX1 to PIX4 is connected to each of the capacitance wirings CW. In the following description, when each pixel PIX1 to PIX4 is not distinguished, it is referred to as pixel PIX. When each gate wiring GL1 to GL4 and source wiring SL1 to SL4 are also not distinguished, they are referred to as gate wiring GL and source wiring SL.

The pixel PIX has a transistor Tr, a liquid crystal element LE, and a retention capacitance C. A gate of the transistor Tr is connected to the gate wiring GL, a source of the transistor Tr is connected to the source wiring SL, and a drain of the transistor Tr is connected to one electrode of the liquid crystal element LE and one electrode of the holding capacitance C. The other electrode of the liquid crystal element LE is connected to the common wiring (common wirings 16, 18, and 22 shown in FIG. 3). The other electrode of the retention capacitance C is connected to the capacitance wiring CW.

The transistor Tr has a function of controlling the writing time of the video signal supplied from the source wiring to the pixel by switching between the ON state and OFF state. When the transistor Tr is turned ON, the potential corresponding to the video signal supplied from the source wiring can be written into the retention capacitance C electrically connected to the transistor Tr. Also, the potential held in the retention capacitance C can be retained by turning the transistor Tr to the OFF state.

Figure 5:
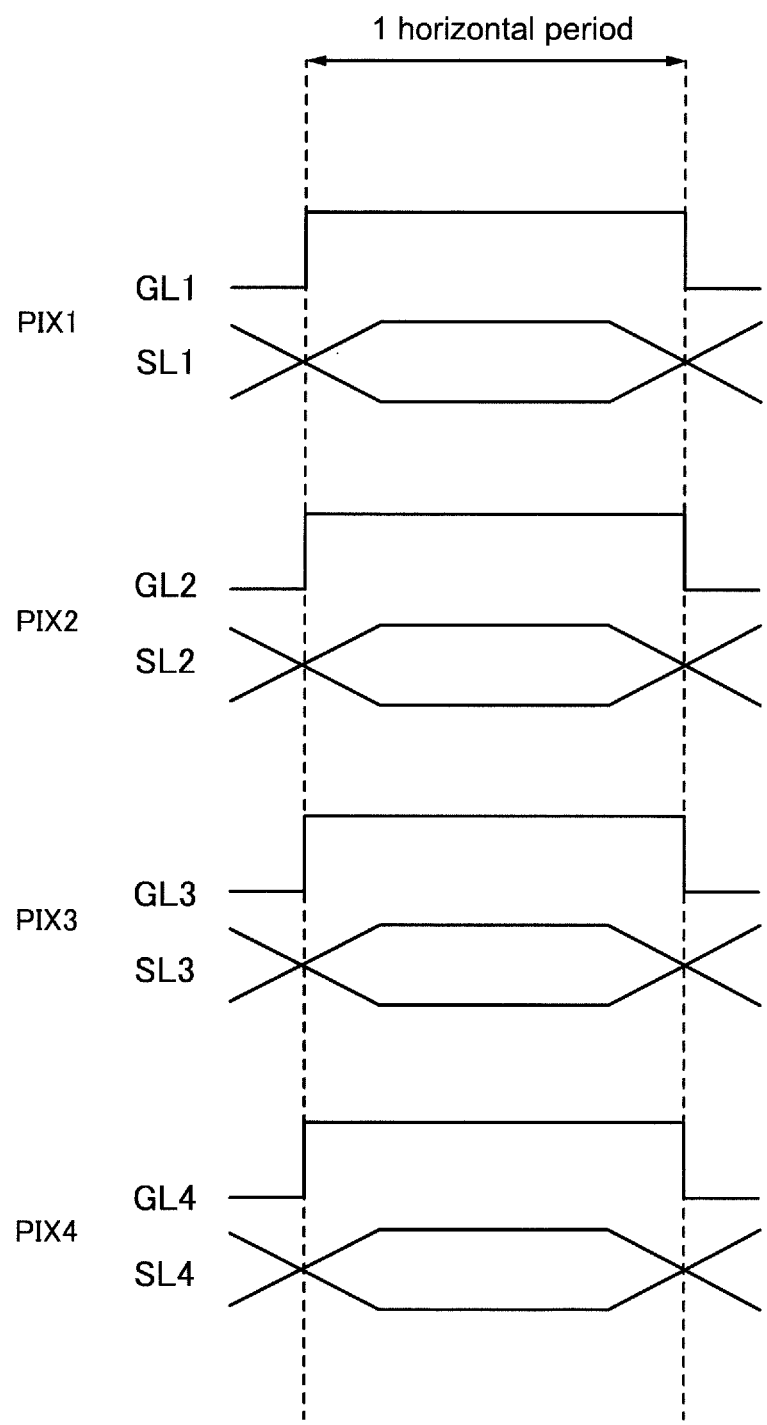
FIG. 5 is a timing chart for driving pixels in a display device according to an embodiment of the present invention.

FIG. 5 is a timing chart of the display device 10 according to an embodiment of the present invention. Normally, the gate wirings GL are supplied with ON-voltage one row at a time to sequentially charge the pixel rows lined up in the direction D2 with the same source wiring. In contrast, in this system, the ON-voltage is supplied to the four gate wirings GL simultaneously, so that the transistor Tr in each of the four pixels is in the ON state at the same time. In this state, video signals are supplied simultaneously to the different source wirings SL1 to SL4. This makes it possible to drive the four pixels lined up in the direction D2 simultaneously.

As shown in FIG. 4, one row of pixels arranged in the column direction is arranged between the source wiring SL1 and the source wiring SL3 and the source wiring SL2 and the source wiring SL4. In other words, four source wirings SL1 to SL4 are arranged between one row of pixels arranged in the column direction and one adjacent row of pixels.

The source wiring SL1 and the source wiring SL3 have an intersection region. In addition, the source wiring SL2 and the source wiring SL4 have an intersecting region. In other words, the source wiring SL1 and the source wiring SL3 are interchanged and the source wiring SL2 and the source wiring SL4 are interchanged. It is possible to make the resistance of the source wirings SL1 to SL4 and the capacitance uniform. In addition, it is possible to suppress defects caused by static electricity during the manufacturing of display panels.

Figure 6:
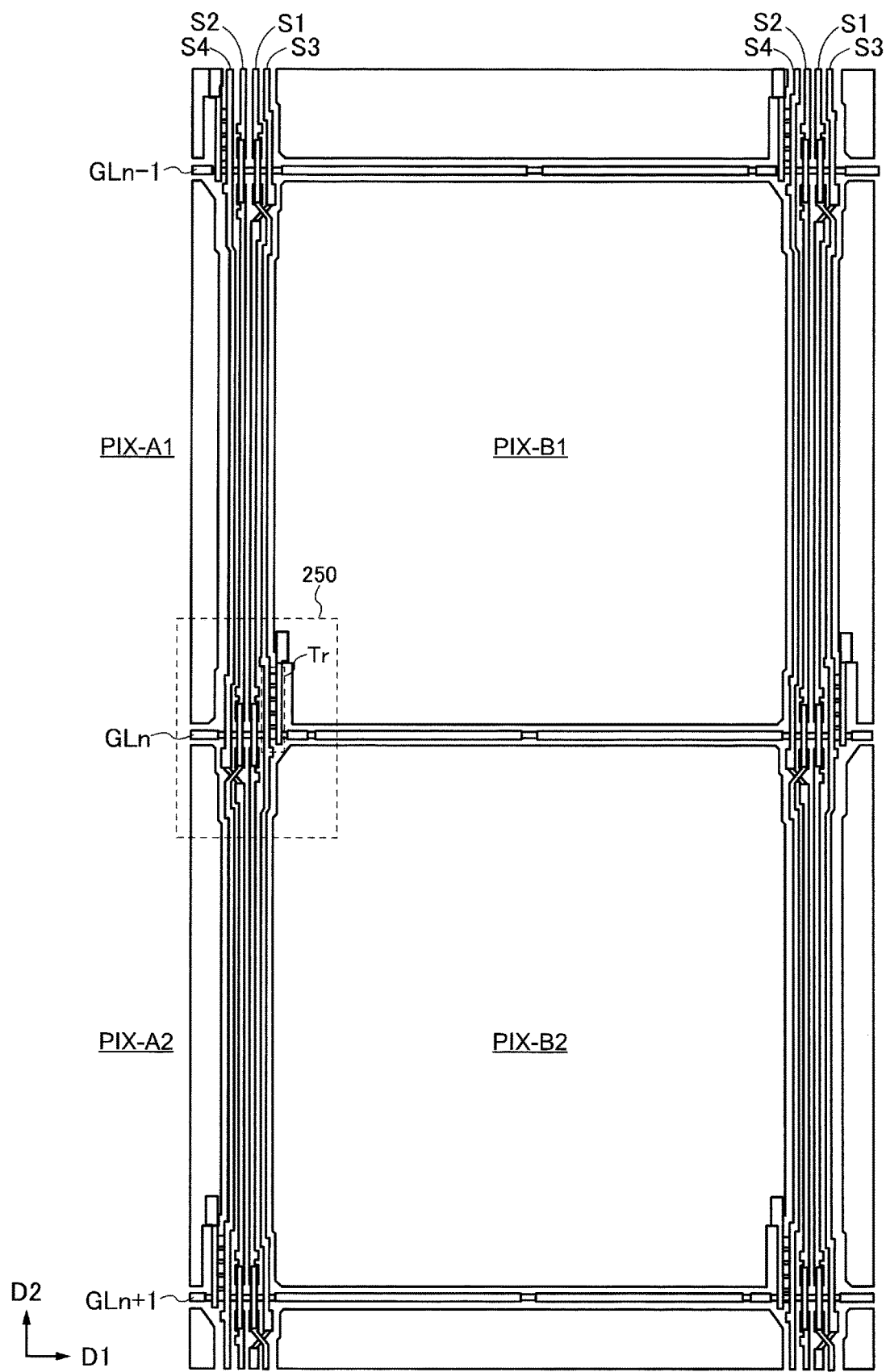
FIG. 6 is a planar layout of pixels in a display device according to an embodiment of the present invention.

Planar Layout of Pixels:

FIG. 6 shows the planar layout of a pixel PIX in the display device 10 according to an embodiment of the present invention. FIG. 6 shows the configuration of a pixel PIX-B1 and a pixel PIX-B2 in a plan view.

As shown in FIG. 6, the gate wirings GLn−1 to GLn+1 are arranged along the first direction D1. In addition, the source wirings S1 to S4 are arranged along the second direction D2. Here, an aperture area of the pixel PIX-B1 is an area surrounded by the adjacent gate wiring GLn−1, the gate wiring GLn, the source wiring S1, and the source wiring S4. The pixel PIX-B1 is controlled by the transistor Tr arranged in the region 250.

FIG. 6 shows four source wirings S1 to S4 arranged around the pixel PIX, but the number of source wirings is not limited; for example, only one source wiring may be arranged around one pixel PIX.

Each pixel PIX shown in FIG. 6 can be divided into a wiring region with the gate wiring GL and the source wiring SL around it and an aperture area adjacent to the wiring region. The aperture area allows light incident from the back of the substrate to pass through, thus making the display region 12 appear transparent.

Figure 7:
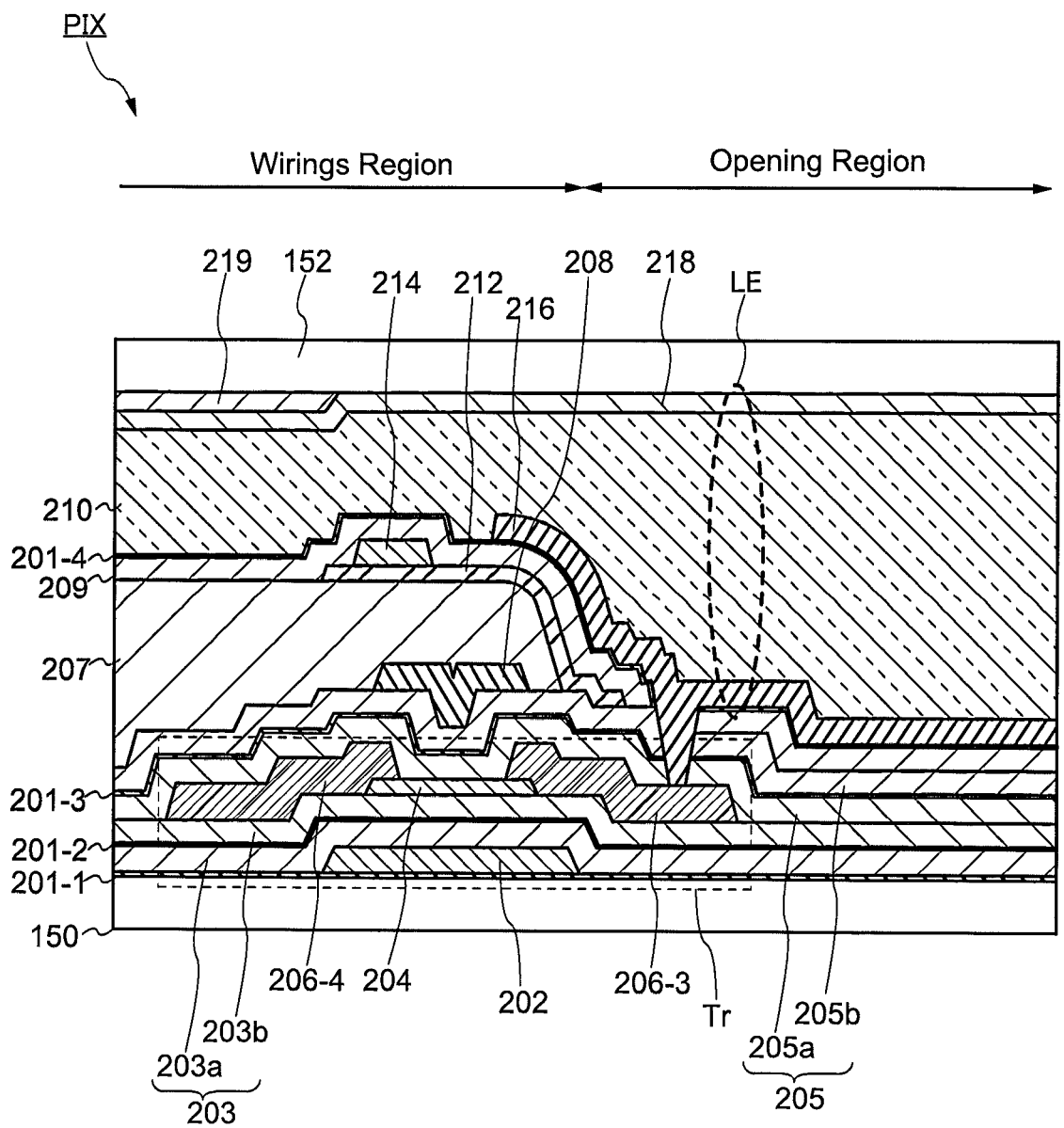
FIG. 7 is a cross-sectional view of a pixel in a display device according to an embodiment of the present invention.

Cross-Sectional Structure of Pixel:

A stacking structure of the pixel PIX in the display device 10 according to an embodiment of the present invention will be described. FIG. 7 is a schematic diagram of the cross-section of the pixel PIX in the display device 10 according to an embodiment of the present invention.

As mentioned above, the pixel PIX has the aperture area that transmits outside light (right side of FIG. 7) and other wiring areas (left side of FIG. 7). The transistor Tr, the gate wiring GL, and the source wiring SL, and most of the other wiring are arranged in the wiring area.

As shown in FIG. 7, the transistor Tr is arranged on the array substrate 150. The transistor Tr has a conductive layer 202 arranged on the array substrate 150, an oxide semiconductor layer 204 arranged opposite the conductive layer 202, a first insulating layer 203 arranged between the conductive layer 202 and the oxide semiconductor layer 204, a conductive layer 206-3 and conductive layer 206-4 arranged on top of the oxide semiconductor layer 204. The conductive layer 202 has a function as the gate wiring GL (gate electrode layer), and the conductive layer 206-4 has a function as the source wiring SL (source electrode layer). In this embodiment, an example of using a bottom-gate type transistor as the transistor Tr is described.

A translucent oxide semiconductor is used as the semiconductor layer for the transistor Tr that configures the transparent display. The oxide semiconductor is easily formed with oxygen defects during the film formation process. Therefore, it is preferable to provide an oxide insulating layer and the oxide semiconductor layer in contact with each other in order to repair oxygen defects. The contact between the oxide semiconductor layer and the oxide insulating layer can repair oxygen defects by oxygen released from the silicon oxide film during heat treatment in the manufacturing process of the transparent display. For example, it is preferable to use silicon oxide as the oxide insulating layer in contact with the oxide semiconductor layer.

When a silicon oxide layer is used as the gate insulating layer in the bottom-gate type transistor, the silicon oxide layer may contact the array substrate. However, there is a risk that impurity elements contained in the array substrate may reach the oxide semiconductor layer through the silicon oxide layer. When a nitride insulating layer and an oxide insulating layer are stacked as the gate insulating layer from the gate electrode layer side, the nitride insulating layer can block impurity elements contained in the array substrate by contacting the array substrate.

When the first insulating layer 203 is arranged on the array substrate 150 and, for example, the first nitride insulating layer 203a within the first insulating layer 203 is in contact with the array substrate 150, due to the refractive index difference at the interface between the array substrate 150 and the first nitride insulating layer 203a, interference and reflection loss of external light incident from the backside of the substrate may appear. As a result, chromaticity variations and reduction in brightness of light in the display part of the display are likely to appear. Therefore, the first buffer layer 201-1 can be arranged between the array substrate 150 and the first insulating layer 203 to mitigate the refractive index difference. The first buffer layer 201-1 has a higher refractive index than the array substrate 150 at the interface between the first buffer layer 201-1 and the array substrate 150. Also, at the interface between the first buffer layer 201-1 and the first insulating layer 203, the first buffer layer 201-1 has a lower refractive index than the first insulating layer 203. It is possible to prevent chromaticity variations and reductions in brightness of the light transmitted in the aperture region, by mitigating the abrupt change in refractive index between each layer in this manner.

Figure 8A:
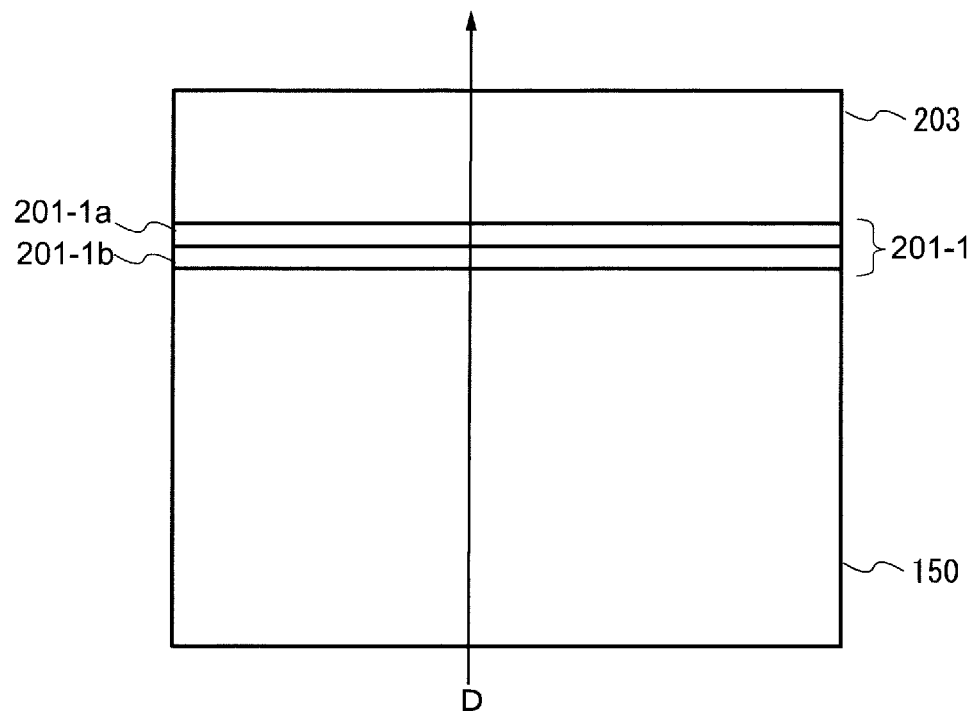
FIG. 8A is a schematic diagram of a buffer layer in an embodiment of the present invention.

The first buffer layer 201-1 may be a single layer or may be configured with a plurality of sub-buffer layers with different refractive indices. FIG. 8A is a schematic diagram of a configuration in which the first buffer layer 201-1 is composed of a plurality of sub-buffer layers 201-1a and 201-1b. When the refractive index of the first insulating layer 203 is "A", the refractive index of the array substrate 150 is "B", the refractive index of the sub-buffer layer 201-1a is "a" and that of the sub-buffer layer 201-1b is "b", and the refractive index of the sub-buffer layer is adjusted so that the relationship is B<b<a<A. Since the refractive index difference between the array substrate 150 and the first insulating layer 203 is relaxed step by step by the plurality of sub-buffer layers, even if light enters from the direction of the arrow D in FIG. 8A, reflection loss and interference at the interface between the array substrate 150 and the first insulating layer 203 are less likely to appear, and fluctuations in chromaticity and reduction in brightness of transmitted light can be suppressed.

The method to vary the refractive index stepwise within the first buffer layer 201-1 is not limited to methods that use the plurality of sub-buffer layers. For example, the first buffer layer 201-1 may be a single layer, and the refractive index may be continuously changed by continuously changing the components within the layer.

A thickness of the first buffer layer is, for example, 5 nm or more and 100 nm or less, preferably 10 nm or more and 30 nm or less, to avoid the influence of interference in the buffer layer.

As the first insulating layer (gate insulating layer), a nitriding insulating layer such as silicon nitride and an oxidizing insulating layer such as silicon oxide can be stacked. FIG. 7 shows a configuration in which the first insulating layer 203 is configured by the first nitride insulating layer 203a and the first oxide insulating layer 203b and is arranged between the conductive layer 202 and the conductive layer 206-4. In this case, since a large difference in refractive index between the first nitride insulating layer 203a and the first oxide insulating layer 203b may cause reflection loss and interference at the interface between the two layers, chromaticity variation of light transmitted from the backside of the substrate is likely to appear and the brightness is also likely to decrease.

When the insulating layer on the substrate has a stacked structure of the nitride insulating layer with a high refractive index and the oxide insulating layer with a low refractive index, a buffer layer can be further arranged to relax the refractive index difference between the two layers. In the aspect shown in FIG. 7, the second buffer layer 201-2 is arranged between the first nitride insulating layer 203a and the first oxide insulating layer 203b to relax the refractive index difference. The refractive index of the second buffer layer 201-2 can be adjusted to be lower than the first nitride insulating layer 203a and higher than the first oxide insulating layer 203b.

A thickness of the first nitride insulating layer 203a is 100 nm or more and 500 nm or less, preferably 200 nm or more and 400 nm or less, and a thickness of the first oxide insulating layer is 20 nm or more and 400 nm or less, preferably 100 nm or more and 300 nm or less. An overall film thickness of the first insulating layer 203 is, for example, 120 nm or more and 900 nm or less, and preferably 300 nm or more and 600 nm or less. A thickness of the second buffer layer is, for example, 5 nm or more and 100 nm or less, preferably 10 nm or more and 30 nm or less, to reduce the influence of interference in the buffer layer.

Figure 8B:
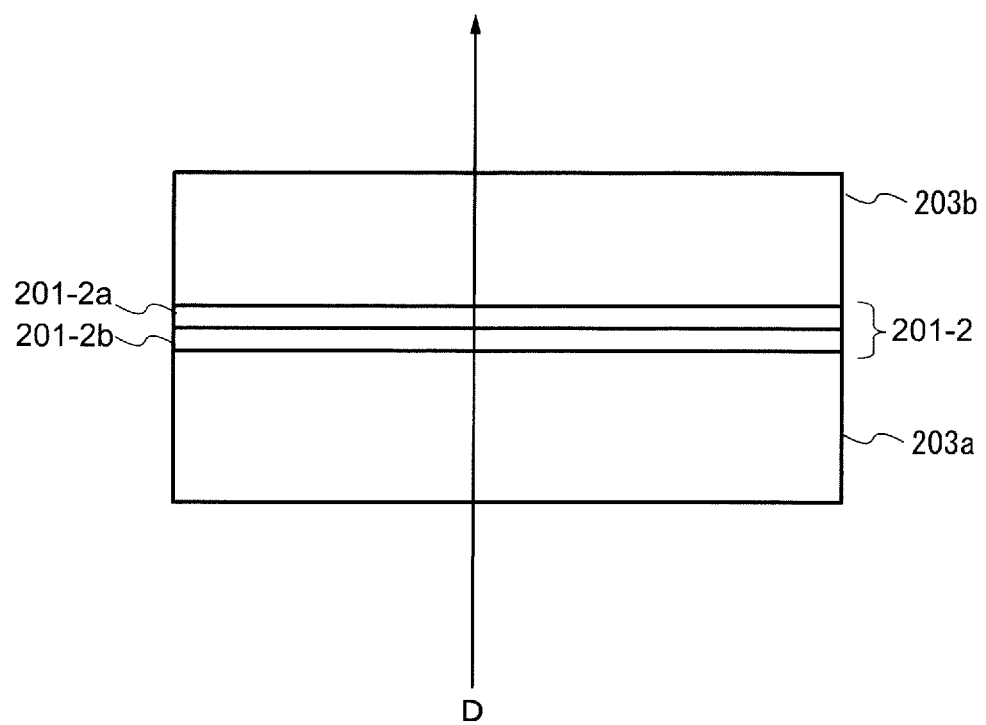
FIG. 8B is a schematic diagram of a buffer layer in an embodiment of the present invention.

As shown in FIG. 8B, the second buffer layer 201-2 may also be configured to have a stepwise change in refractive index with a plurality of sub-buffer layers with different refractive indices (for example, shown in FIG. 8B, buffer layers 201-2a and 201-2b). The second buffer layer 201-2 may be a single layer and adjusted so that the refractive index changes continuously.

A second insulating layer 205 is arranged above the transistor Tr. The second insulating layer 205 has a function as a passivation layer. The second insulating layer 205 is configured with a second oxide insulating layer 205a and a second nitride insulating layer 205b. It is possible to repair oxygen defects in the oxide semiconductor layer 204 if oxygen is released from the first oxide insulating layer 203b and the second oxide insulating layer 205a during the process, by sandwiching the oxide semiconductor layer 204 between the second oxide insulating layer 205a and the first oxide insulating layer 203b.

In this case, when the difference in refractive index between the second nitride insulating layer 205b and the second oxide insulating layer 205a is large, there may be reflection loss or interference at the interface between the two layers, which can easily cause chromaticity fluctuations in light rays transmitted from the backside of the substrate and decrease the brightness. Therefore, similar to the previously mentioned first insulating layer 203, a buffer layer can be further arranged to relax the refractive index difference between the second nitride insulating layer 205b and the second oxide insulating layer 205a, which configure the second insulating layer 205. In the aspect of FIG. 7, a third buffer layer 201-3 is arranged between the second nitride insulating layer 205b and the second oxide insulating layer 205a to relax the refractive index difference. The refractive index of the third buffer layer 201-3 can be adjusted to be lower than the second nitride insulating layer 205b and higher than the second oxide insulating layer 205a.

A thickness of the second nitride insulating layer 205b used as the second insulating layer 205 (passivation layer) is 50 nm or more and 400 nm or less, preferably 50 nm or more and 200 nm or less, and a thickness of the second oxide insulating layer 205a is 100 nm or more and 500 nm or less, preferably 200 nm or more and 400 nm or less. A thickness of the entire second insulating layer 205 in the wiring region is, for example, 150 nm or more to 900 nm or less, preferably 300 nm or more to 600 nm or less. A thickness of the third buffer layer is, for example, 5 nm or more to 100 nm or less, preferably 10 nm or more to 30 nm or less, in order to reduce the influence of interference in the buffer layer.

As with the second buffer layer 201-2, the third buffer layer 201-3 may be configured to have a stepwise change in refractive index with a plurality of sub-buffer layers with different refractive indices. The third buffer layer 201-3 may be adjusted as a single layer so that the refractive index changes continuously.

A conductive layer 208 is arranged on the second insulating layer 205 at a position opposite to the oxide semiconductor layer 204. The conductive layer 208 has a function as a back gate electrode. In this embodiment, the transistor Tr is described as being a bottom gate drive transistor, but it is not limited to this type of transistor and may be a top gate type transistor or a dual gate type transistor.

A planarization layer 207 may be arranged on the conductive layer 208 and the second insulating layer 205. The planarization layer 207 is arranged to alleviate the unevenness of the various wirings configuring the transistor Tr. When the display device 10 is applied to a transparent display, the planarization layer 207 should be removed in the aperture area of the pixel PIX. This can prevent light from being absorbed by the planarization layer 207 in the aperture area.

A transparent conductive layer 212 is arranged on the planarization layer 207 and the second insulating layer 205. A conductive layer 214 is arranged on the transparent conductive layer 212. The transparent conductive layer 212 and conductive layer 214 have a function as capacitance wiring (capacitance wiring CW shown in FIG. 4). A third insulating layer 209 (capacitive insulating layer) is arranged on the transparent conductive layer 212 and conductive layer 214. A pixel electrode 216 is arranged on the third insulating layer 209. The pixel electrode 216 is connected to the conductive layer 206-3 through openings in the second insulating layer 205 and the third insulating layer 209, and overlaps the opening region. A thickness of the third insulating layer 209 (capacitive insulating layer) is 100 nm to 300 nm, preferably 150 nm to 250 nm.

When the pixel electrode 216 is arranged on the third insulating layer 209, there may be interference and reflection loss of light due to the refractive index difference between the third insulating layer 209 and the pixel electrode 216. In particular, chromaticity fluctuations and reductions in brightness of light transmitted from the back surface of the substrate to the surface in the aperture area are likely to appear. Therefore, the difference in refractive index can be relaxed by providing a fourth buffer layer 201-4 between the third insulating layer 209 and the pixel electrode 216. The fourth buffer layer 201-4 has a lower refractive index than the pixel electrode at an interface between the fourth buffer layer 201-4 and the pixel electrode 216. The fourth buffer layer 201-4 has a lower refractive index than the third insulating layer 209 at an interface with the third insulating layer 209. It is possible to prevent chromaticity fluctuations and reductions in brightness of light transmitted in the aperture area, by mitigating the abrupt change in refractive index between each layer in this manner.

The thickness of the fourth buffer layer is, for example, 5 nm or more and 100 nm or less, preferably 10 nm or more and 30 nm or less, in order to prevent the influence of interference in the buffer layer.

The fourth buffer layer 201-4 may be configured so that the refractive index varies stepwise with a plurality of sub-buffer layers with different refractive indices, as in the first buffer layer 201-1. The fourth buffer layer 201-4 may also be a single layer and adjusted to have a continuously changing refractive index.

The counter substrate 152 is arranged opposite the array substrate 150. A light shielding layer 219 and a common electrode 218 are arranged on the counter substrate 152. The light shielding layer 219 has a function as a black matrix. FIG. 7 shows that the light shielding layer 219 is arranged in a region overlapping the conductive layer 206-4. The light shielding layer 219 has a grid pattern and is arranged to cover the gate wiring GL and the source wirings SL1 to SL4. The common electrode 218 has a size that extends over the entire surface of the display region 12. The light shielding layer 219 may be formed of a metal film, and is arranged in contact with the common electrode 218, which is formed of a transparent conductive layer, to function as an auxiliary electrode. The liquid crystal layer 210 is arranged between the array substrate 150 and the counter substrate 152, and may be sealed by a sealing material. The pixel electrode 216, the liquid crystal layer 210, and the common electrode 218 configure the liquid crystal element LE.

Materials of Each Component of the Display Device:

A rigid substrate that is translucent and not flexible, such as a glass substrate, quartz substrate, and sapphire substrate, can be used as the array substrate 150 and counter substrate 152. When the array substrate 150 and the counter substrate 152 need to be flexible, flexible substrates containing resin and having flexibility, such as polyimide, acrylic, siloxane, or fluoropolymer substrates, can be used as the array substrate 150 and the counter substrate 152. Impurities may be incorporated into the above resin to improve the heat resistance of the array substrate 150 and the counter substrate 152. When the display device 10 is applied to transparent displays or large high-definition displays, it is preferable to use glass substrates as the array substrate 150 and the counter substrate 152. For the first transparent substrate 151A and the second transparent substrate 151B, these substrates are arranged to protect the array substrate 150 and the counter substrate 152. Therefore, for example, it is preferable to use a translucent glass substrate, plastic substrate, or the like.

The nitride insulating layers 203a, 205b, and insulating layer 209 contain nitrogen, oxygen, silicon, and aluminum, preferably nitrogen and silicon. Specifically, silicon nitride ($SiN_x$), silicon nitride oxide ($SiN_xO_y$), aluminum nitride ($AlN_x$), aluminum nitride oxide ($AlN_xO_y$), are used as these insulating layers. In this embodiment, silicon nitride is used as the nitride insulating layers 201, 203a, 205b, and insulating layer 209. The silicon nitride layer is formed, for example, by sputtering.

The first oxidized insulating layer 203B and the second oxidized insulating layer 205A contain oxygen, silicon, and aluminum, preferably oxygen and silicon. Specifically, silicon oxide ($SiO_x$), silicon nitride oxide ($SiO_xN_y$), aluminum oxide ($AlO_x$), aluminum nitride oxide ($AlO_xN_y$), are used as these insulating layers. In this embodiment, silicon oxide is used as the first oxide insulating layer 203b and the second oxide insulating layer 205a. The silicon oxide layers are formed, for example, by sputtering.

$SiO_xN_y$ and $AlO_xN_y$ are silicon and aluminum compounds containing a smaller ratio (x>y) of nitrogen (N) than oxygen (O). $SiN_xO_y$ and $AlN_xO_y$ are silicon and aluminum compounds containing a smaller proportion (x>y) of oxygen than nitrogen.

The first buffer layer 201-1, the second buffer layer 201-2, the third buffer layer 201-3, and the fourth buffer layer 201-4 contain nitrogen, oxygen, silicon, aluminum, and preferably nitrogen and silicon. Specifically, silicon nitride ($SiN_{x1}O_{y1}$) and aluminum nitride ($AlN_{x1}O_{y1}$) can be used for these buffer layers. The ratio of N to O in each buffer layer can be adjusted accordingly so that the refractive index of each buffer layer is an intermediate value of the refractive index of each layer between the buffer layers. Therefore, these buffer layers can also be called nitride oxide insulating layers.

Organic insulating materials such as polyimide resin, acrylic resin, epoxy resin, silicone resin, fluorine resin, or siloxane resin can be used as the planarization film 207.

Common metallic materials can be used as the conductive layers 202, 206-3, 206-4, 208, 214. For example, aluminum (Al), titanium (Ti), chromium (Cr), cobalt (Co), nickel (Ni), molybdenum (Mo), hafnium (Hf), tantalum (Ta), tungsten (W), bismuth (Bi), silver (Ag), and alloys or compounds thereof are used. The above materials may be used in a single layer or in a laminate as the above components.

Oxide semiconductors having semiconductor properties can be used as the oxide semiconductor layer 204. The oxide semiconductor layer 204 has translucency. For example, an oxide semiconductor containing two or more metals including indium (In) is used as the oxide semiconductor layer 204. For example, an oxide semiconductor including indium (In), gallium (Ga), zinc (Zn), and oxygen (O) may be used as the oxide semiconductor layer 204. In particular, an oxide semiconductor having a composition ratio of In:Ga:Zn:O=1:1:1:4 may be used. However, the oxide semiconductor layer 204 used in this embodiment is not limited to the above composition, and an oxide semiconductor with a composition different from the above may also be used.

For example, the ratio of In may be larger than the above to improve mobility. The ratio of Ga may be larger than the above to increase the band gap and reduce the effect of light irradiation. The oxide semiconductor layer 204 may be amorphous or polycrystalline. The oxide semiconductor layer 204 may be a mixture of amorphous and crystalline phases.

As the oxide semiconductor layer 204, the ratio of indium to the total oxide semiconductor may be 50% or more. As the oxide semiconductor layer 204, an oxide semiconductor in which gallium (Ga), zinc (Zn), aluminum (Al), hafnium (Hf), yttrium (Y), zirconia (Zr), and lanthanides are added to indium is used. Elements other than those listed above may be added as the oxide semiconductor layer 204. When the ratio of indium to the total oxide semiconductor is 50% or more, the oxide semiconductor layer 204 has a polycrystalline structure.

A mixture of indium oxide and tin oxide (ITO) and a mixture of indium oxide and zinc oxide (IZO) may be used as the transparent conductive layer 212, pixel electrode 216, and common electrode 218. Materials other than those listed above may be used as transparent conductive layers. The light shielding layer 219 used for the black matrix BM can be formed of black resin or a metal material. The black matrix BM is formed in contact with the common electrode 218. In contrast to the common electrode 218 formed with a transparent conductive film, the black matrix BM can function as an auxiliary electrode to reduce resistance loss by forming the black matrix BM with a metallic material. As a metallic material to form the black matrix BM, it is preferable to use chromium, molybdenum, titanium, and the like, which have relatively low reflectivity compared to aluminum.

When the display device 10 is applied to a transparent display, it is preferable to use polymer-dispersion liquid crystals as the liquid crystal layer 210. The polymer-dispersion liquid crystal includes a bulk and microparticles. The microparticles change alignment in the bulk according to the potential difference between the pixel electrode 216 and the common electrode 218. The potential of the pixel electrode 216 is controlled separately for each pixel PIX, thereby controlling at least the degree of either translucency or dispersion for each pixel PIX. The degree of scattering of the liquid crystal layer (particulates) is controlled according to the voltage of each pixel electrode 216 and the voltage of the common electrode 218. For example, the liquid crystal layer may use a polymer-dispersion liquid crystal such that the degree of scattering increases as the voltage between each pixel Pix and the common electrode 218 increases, the polymer-dispersion liquid crystal may be used such that the degree of scattering increases as the voltage between each pixel electrode 216 and the common electrode 218 decreases.

A normal light refractive index of the bulk and microparticles are equal to each other in the liquid crystal layer 210. When a voltage is not applied between the pixel electrode 216 and the common electrode 218, the refractive index difference between the bulk and the microparticles is close to zero in all directions. The liquid crystal layer 210 is in a non-scattering state that does not scatter light emitted from the light source 104. The light emitted from the light source 104 propagates in a direction away from the light source 104, reflecting on the first main surface of the array substrate 150 and the first main surface of the counter substrate 152. When the liquid crystal layer 210 is in a non-scattering state that does not scatter light L emitted from the light source 104, the background of the counter substrate 152 is visible from the array substrate 150 and the background of the array substrate 150 is visible from the counter substrate 152.

The optical axis of the microparticles will be tilted by the electric field generated between the pixel electrode 216 and the common electrode 218 to which a voltage is applied. Since the optical axis of the bulk is not changed by the electric field, the orientation of the optical axis of the bulk and the optical axis of the microparticles are different from each other. At the pixel PIX with the pixel electrode 216 to which a voltage is applied, the light emitted from the light source 104 is scattered. As described above, the light emitted from the light source 104 is scattered and emitted from the first main surface of the array substrate 150 or the first main surface of the counter substrate 152 to the outside, where it is visible to an observer.

In the pixel PIX where no voltage is applied to the pixel electrode 216, the background on the first main surface side of the array substrate 150 is visible from the first main surface of the array substrate 150 and the background on the first main surface side of the counter substrate 152 is visible from the first main surface of the counter substrate 152. When a video signal is input to a specific portion of the pixel PIX, an image based on the video signal is displayed, but background-visible regions coexist in the screen. Thus, by controlling the polymer-dispersion liquid crystal to scattering and non-scattering states, the background can be visible while the image is displayed in the display region 12.

This example describes an optical simulation of chromaticity variation for different configurations of the insulating layer and each of the insulating layers included in the insulating layer.

Chromaticity Variation Measurement:

Optical simulations were performed for displays having the configurations shown in Table 1 for Examples 1 and 2 and Comparative Example A for the aperture area of pixel PIX. Example 1 is configured with a single layer of silicon nitride oxide ($SiN_xO_y$) with a refractive index of 1.75 and a thickness of 20 nm for the first to fourth buffer layers, Example 2 consists of two buffer layers, one with a refractive index of 1.87 and a thickness of 10 nm and the other with a refractive index of 1.63 and a thickness of 10 nm, the comparative example has no buffer layer configuration.

TABLE 1

| Configuration (thickness) | Refractive Index | | Example 1 (1 Buffer Layer) | Example 2 (2 Buffer Layer) | Comparative examples A (No Buffer Layer) |
|---|---|---|---|---|---|
| Glass | 1.51 | | | | |
| ITO | 1.86 | | 35 nm | 35 nm | 35 nm |
| Liquid Crystal | | | | | |
| ITO | 1.86 | | 50 nm | 50 nm | 50 nm |
| 4th Buffer Layer | 1.75 1 Layer | 1.87 + 1.63 2 Layer | 1 Layer (n = 1.75) 20 nm | 2 Layer(n = 1.87, n = 1.63) Each layer 10 nm | non |
| Silicon Nitride (LT) | 2.02 | | 220 nm | 220 nm | 220 nm |
| Silicon Nitride (PAS) | 2.02 | | 100 nm | 100 nm | 100 nm |
| 3rd Buffer Layer | 1.75 1 Layer | 1.87 + 1.63 2 Layer | 1 Layer (n = 1.75) 20 nm | 2 Layer (n = 1.87, n = 1.63) Each layer 10 nm | non |
| Silicon Oxide (PAS) | 1.47 | | 300 nm | 300 nm | 300 nm |
| Silicon Oxide (GI) | 1.47 | | 200 nm | 200 nm | 200 nm |
| 2nd Buffer Layer | 1.75 1 Layer | 1.87 + 1.63 2 Layer | 1 Layer (n = 1.75) 20 nm | 2 Layer (n = 1.87, n = 1.63) Each layer 10 nm | non |
| Silicon Nitride (GI) | 2.02 | | 300 nm | 300 nm | 300 nm |
| 1st Buffer Layer | 1.75 1 Layer | 1.87 + 1.63 2 Layer | 1 Layer (n = 1.75) 20 nm | 2 Layer (n = 1.87, n = 1.63) 各 10 nm | non |
| Glass | 1.51 | | | | |

Table 1 shows GI as a gate insulating layer (first insulating layer), PAS as a passivation layer (second insulating layer), LT as a capacitance insulating layer (third insulating layer), and so on.

Figure 9:
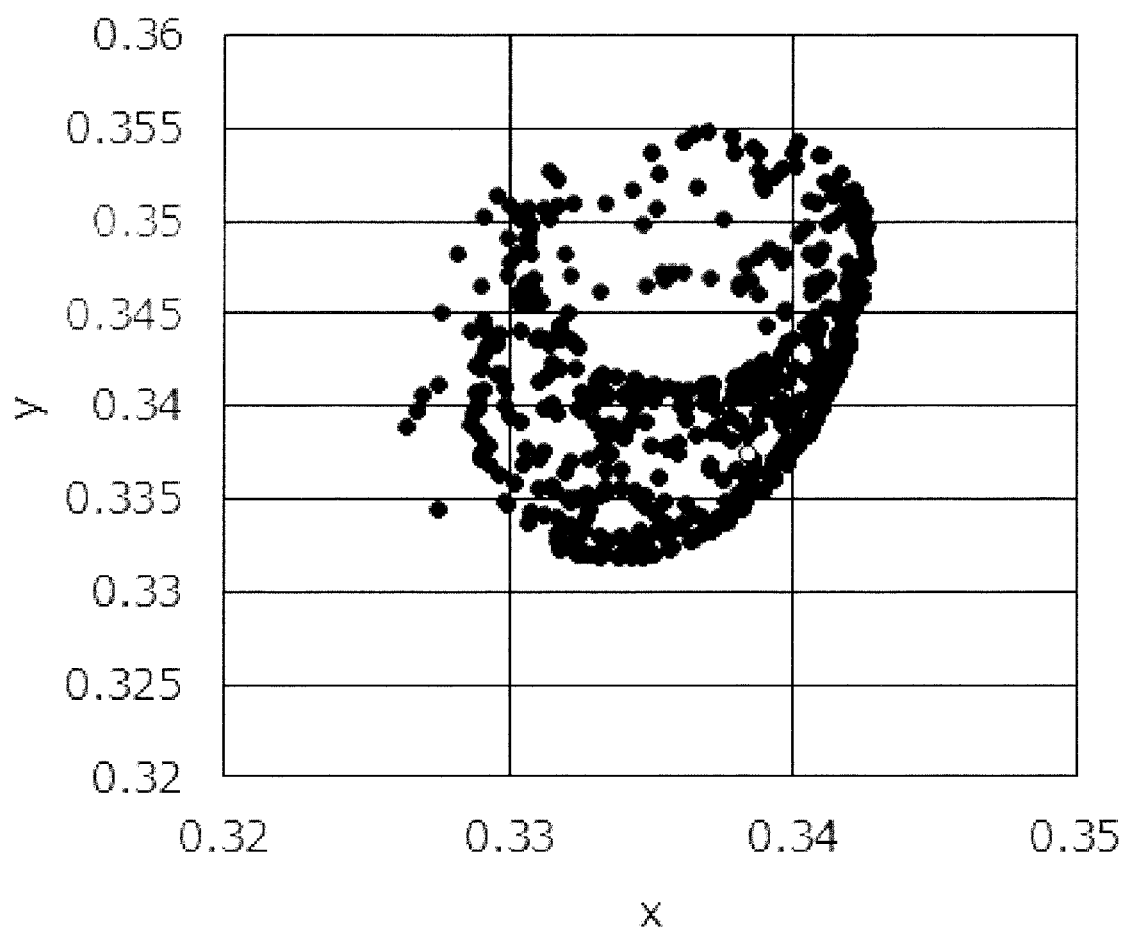
FIG. 9 is an x y chromaticity diagram obtained by optical simulation in the present example.
Figure 10:
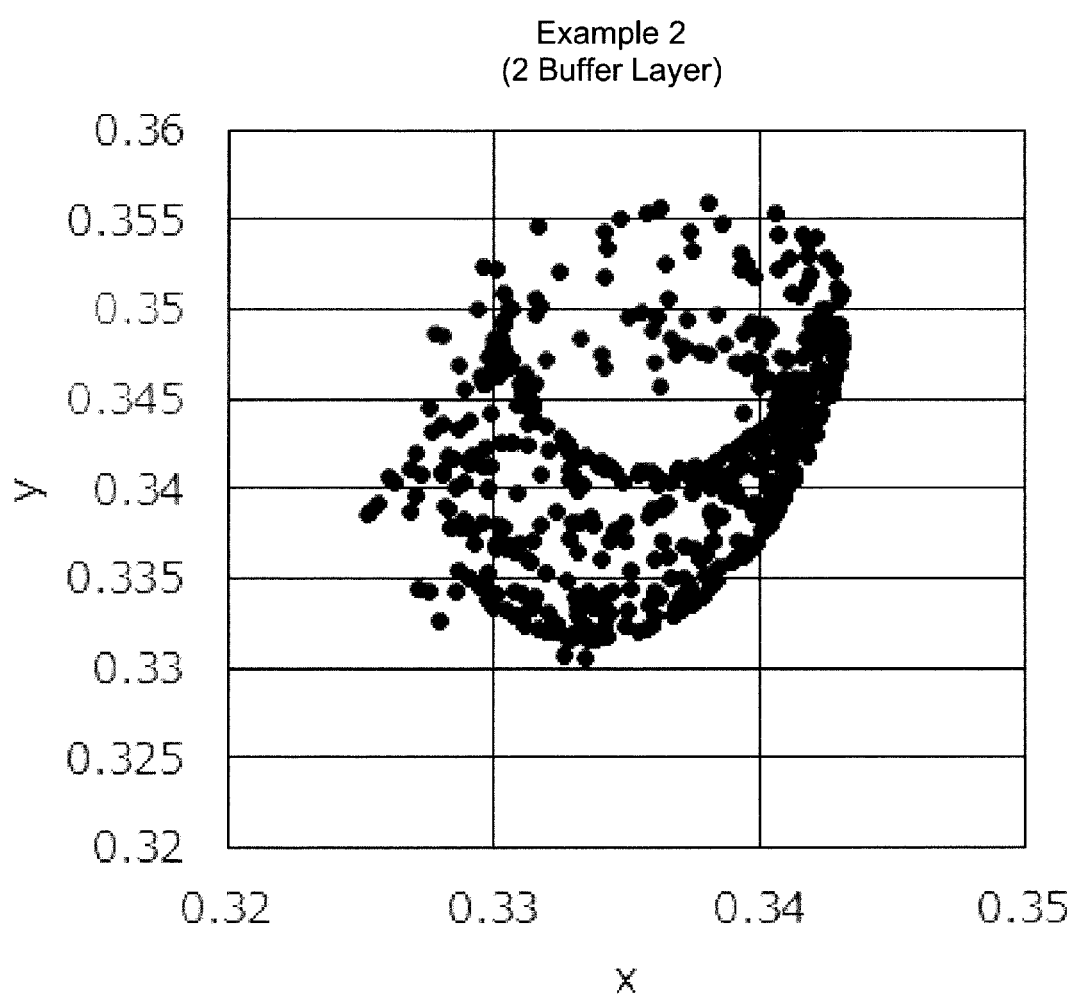
FIG. 10 is an x y chromaticity diagram obtained by optical simulation in the present example.
Figure 11:
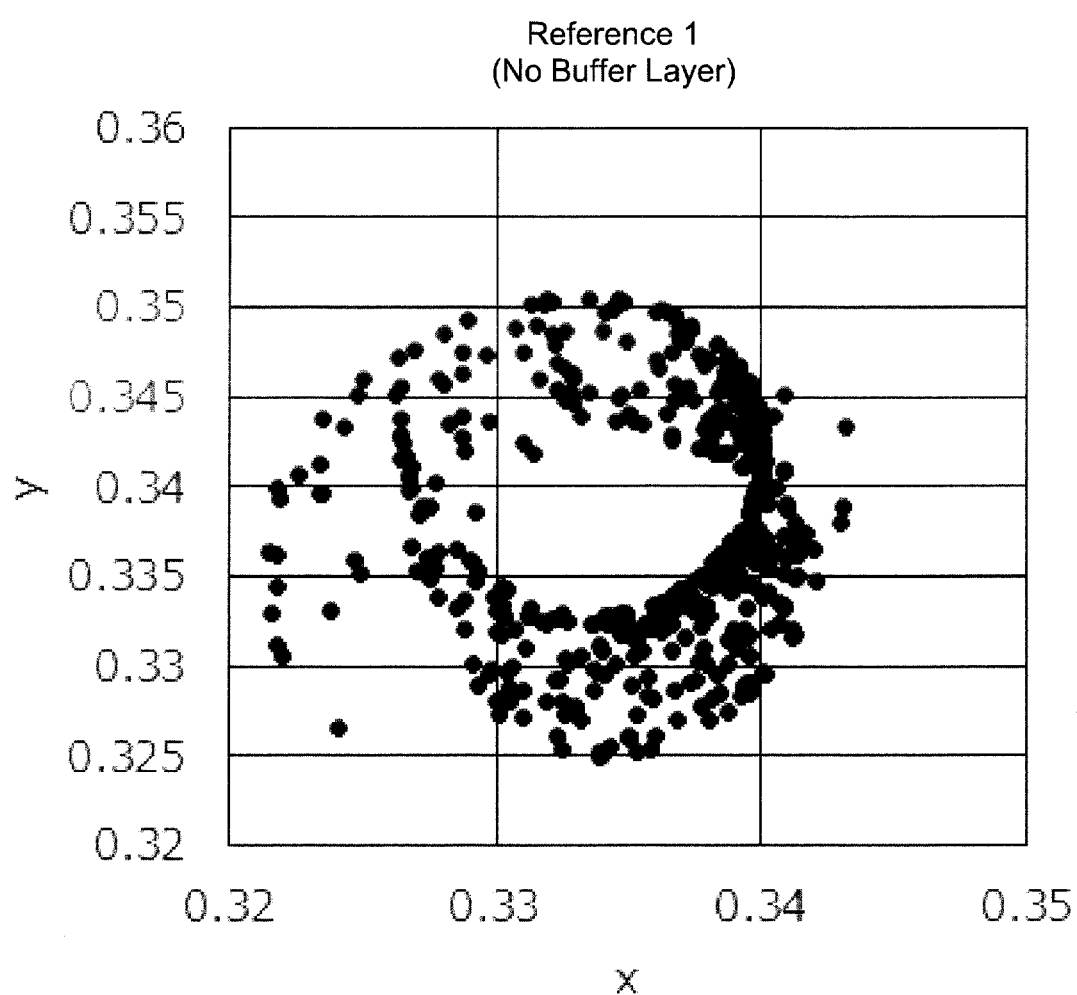
FIG. 11 is an x y chromaticity diagram obtained by optical simulation in the present example.

In order to confirm the chromaticity variation in the aperture area of a plurality of pixels PIX, optical simulations were performed to calculate chromaticity using the transfer matrix method. FIG. 9 to FIG. 11 are xy chromaticity diagrams obtained by optical simulation. FIG. 9 to FIG. 11 are enlarged views of the region where x is 0.32 to 0.35 and y is 0.32 to 0.36 in the xy chromaticity diagram in the CIE 1931 color space. The number of plots is 500.

Figure 12:
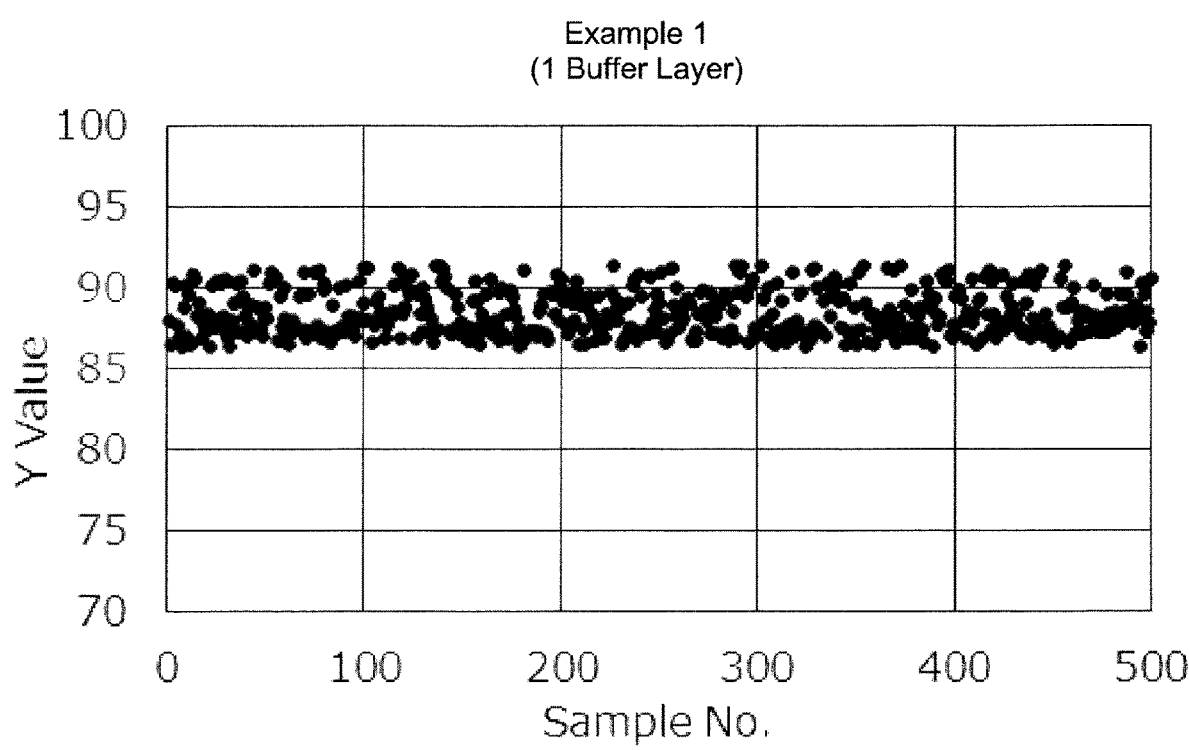
FIG. 12 is a y-value diagram obtained by optical simulation in the present example.
Figure 13:
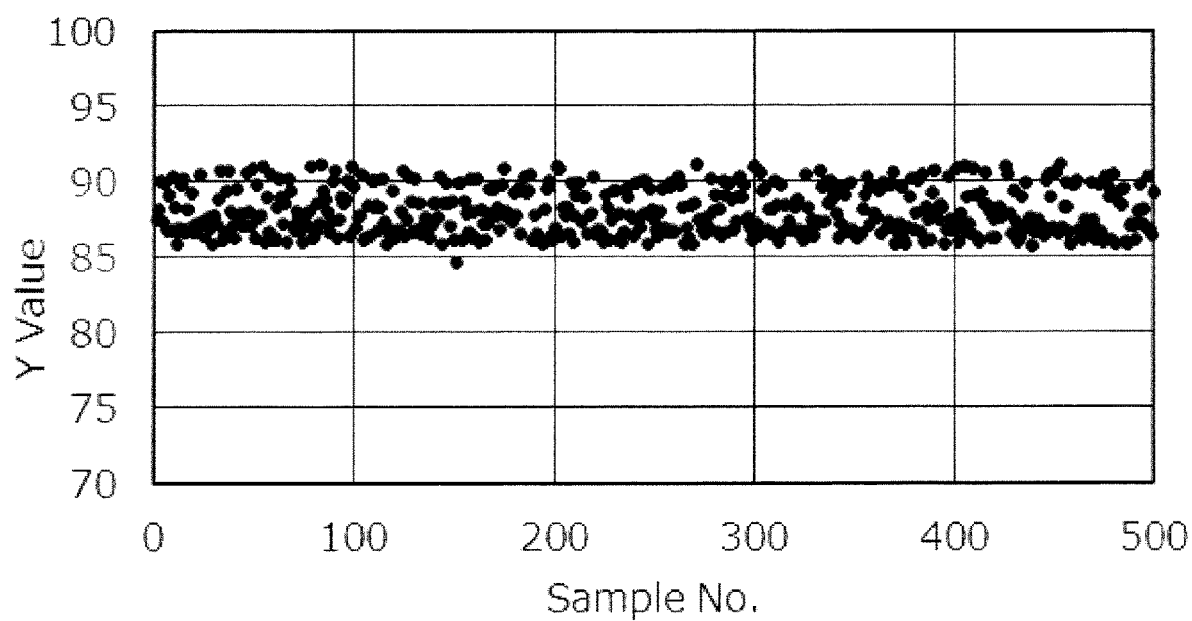
FIG. 13 is a y-value diagram obtained by optical simulation in the present example.
Figure 14:
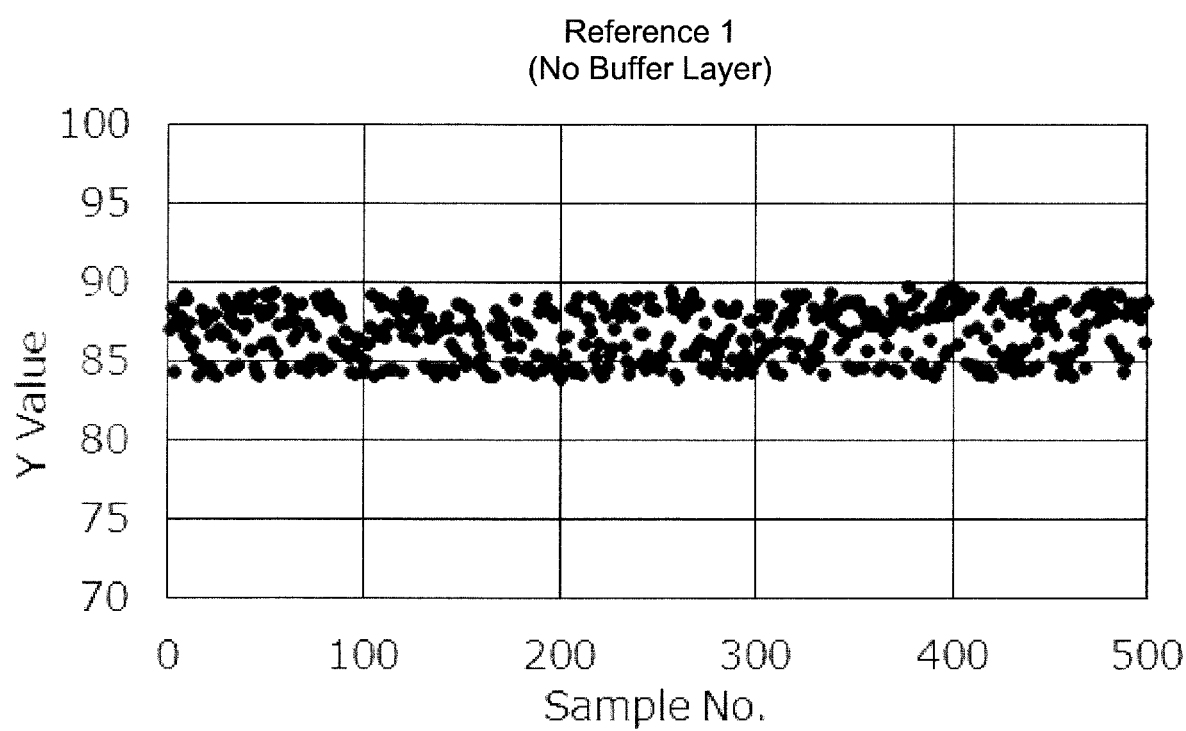
FIG. 14 is a y-value diagram obtained by optical simulation in the present example.

FIG. 9 to FIG. 11 show that Examples 1 and 2 with buffer layers reduce the x value fluctuation by about 30% and improve the xy chromaticity fluctuation by about 30% compared to Comparison Example A without buffer layers.
Brightness Measurement Taking Visual Sensitivity into Account FIG. 12-14 show the results of all Y-value measurements for displays with the configurations shown in Examples 1 and 2 and Comparison Example A, in order to compare the brightness in the aperture area of the plurality of pixels PIX, taking visual sensitivity into account. Although there is no significant difference in the variation of the Y value itself between Examples 1 and 2 and Comparison Example A, it was found that the average Y value of Examples 1 and 2 was about 1-2% higher than that of Example A.

As described above, both chromaticity variation and brightness in the aperture area were improved by adding the buffer layer to relax the refractive index difference of each layer configuring the display region.

Although suitable embodiments are described above, this disclosure is not limited to such embodiments. The content disclosed in embodiments is only an example, and various changes can be made without departing from the intent of this disclosure. Any modification made to the extent that does not depart from the purpose of the present disclosure naturally belongs to the technical scope of the present disclosure.

What is claimed is:

1. A display device, comprising:
a first substrate;
a first buffer layer on the substrate;
a gate wiring on the first buffer layer;
a gate insulating layer on the gate wiring;
a second buffer layer;
a source wiring on the gate insulating layer and intersecting the gate wiring;
a second insulating layer on the source wiring; and
a pixel electrode on the second insulating layer;
wherein:
the gate insulating layer includes a first nitride insulating layer and a first oxide insulating layer,
the first buffer layer is arranged between the first substrate and the first nitride insulating layer, and is arranged between the first substrate and the gate wiring,
the second buffer layer is arranged between the first nitride insulating layer and the first oxide insulating layer,
a refractive index of the first buffer layer is higher than a refractive index of the first substrate, at an interface between the first buffer layer and the first substrate, and
the refractive index of the first buffer layer is lower than a refractive index of the first nitride insulating layer, at an interface between the first buffer layer and the first nitride insulating layer,
a refractive index of the second buffer layer is lower than a refractive index of the first nitride insulating layer, at an interface between the second buffer layer and the first nitride insulating layer, and the refractive index of the second buffer layer is higher than a refractive index of the first oxide insulating layer, at an interface between the second buffer layer and the first oxide insulating layer.

2. The display device according to claim 1, wherein:
the first buffer layer includes nitrogen, oxygen, and silicon, and
the gate insulating layer includes nitrogen, oxygen, and silicon.

3. The display device according to claim 1, wherein:
the first nitride insulating layer of the gate insulating layer includes nitrogen and silicon,
the first oxide insulating layer of the gate insulating layer includes oxygen and silicon, and
the second buffer layer, between the first nitride insulating layer and the first oxide insulating layer of the gate insulating layer, includes nitrogen, oxygen, and silicon.

4. The display device according to claim 1, further comprising a third buffer layer,
wherein:
the second insulating layer includes a second nitride insulating layer and a second oxide insulating layer,
the third buffer layer is arranged between the second nitride insulating layer and the second oxide insulating layer,
a refractive index of the third buffer layer is lower than a refractive index of the second nitride insulating layer, at an interface between the third buffer layer and the second nitride insulating layer, and
the refractive index of the third buffer layer is higher than a refractive index of the second oxide insulating layer, at an interface between the third buffer layer and the second oxide insulating layer.

5. The display device according to claim 4, wherein:
the second nitride insulating layer includes nitrogen and silicon,
the second oxide insulating layer includes oxygen and silicon; and
the third buffer layer includes nitrogen, oxygen and silicon.

6. A displace device, comprising:
a first substrate;
a gate wiring on the first substrate;
a first insulating layer on the gate wiring;
a source wiring on the first insulating layer and intersecting the gate wiring;
a second insulating layer on the source wiring;
a pixel electrode on the second insulating layer;
a first buffer layer between the first substrate and the first insulating layer; and
a third insulating layer between the second insulating layer and the pixel electrode and a fourth buffer layer between the pixel electrode and the third insulating layer,
wherein:
a refractive index of the first buffer layer is higher than a refractive index of the first substrate, at an interface between the first buffer layer and the first substrate,
the refractive index of the first buffer layer is lower than a refractive index of the first insulating layer, at an interface between the first buffer layer and the first insulating layer,
a refractive index of the fourth buffer layer is higher than the refractive index of the pixel electrode, at an interface between the fourth buffer layer and the pixel electrode, and
the refractive index of the fourth buffer layer is lower than the refractive index of the third insulating layer, at an interface between the fourth buffer layer and the third insulating layer.

7. The display device according to claim 6, wherein:
the third insulating layer includes nitrogen and silicon, and
the fourth buffer layer includes nitrogen, oxygen and silicon.

8. The display device according to claim 6, wherein one or more of the first and fourth buffer layers have a continuous or stepwise change in the refractive index.

9. The display device according to claim 8, wherein one or more of the first and fourth buffer layers comprise a plurality of layers each having different refractive indices.

10. The display device according to claim 6, further comprising:
a second substrate opposite the first substrate and having a common electrode facing the pixel electrode;
a liquid crystal layer between the first substrate and the second substrate; and
a light source that emits light toward a side of the first substrate or a side of the second substrate.

11. The display device according to claim 10, wherein the liquid crystal layer is a polymer-dispersion liquid crystal,
wherein:
when the polymer-dispersion liquid crystal is in a scattering state, the polymer-dispersion liquid crystal scatters light emitted from the light source, and
when the polymer-dispersion liquid crystal is in a non-scattering state, a background is visible from the first substrate through the second substrate, and a background is visible from the second substrate through the first substrate.

12. The display device according to claim 6, further comprising a second buffer layer and a third buffer layer, wherein
the first insulating layer includes a first nitride insulating layer and a first oxide insulating layer,
the second insulating layer includes a second nitride insulating layer and a second oxide insulating layer,
the second buffer layer is arranged between the first nitride insulating layer and the first oxide insulating layer,
the third buffer layer is arranged between the second nitride insulating layer and the second oxide insulating layer.

13. The display device according to claim 12, wherein one or more of the first, second, third, and fourth buffer layers have a continuous or stepwise change in the refractive index.

14. The display device according to claim 13, wherein one or more of the first, second, third, and fourth buffer layers comprise a plurality of layers each having different refractive indices.

* * * * *